US006854736B2

(12) United States Patent
Paprotna

(10) Patent No.: US 6,854,736 B2
(45) Date of Patent: Feb. 15, 2005

(54) SEAL ASSEMBLY FOR A ROTARY MACHINE

(75) Inventor: Hubertus Edward Paprotna, Winter Springs, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/397,164

(22) Filed: Mar. 26, 2003

(65) Prior Publication Data

US 2004/0188947 A1 Sep. 30, 2004

(51) Int. Cl.7 .............................................. F16J 15/447
(52) U.S. Cl. ..................................... 277/413; 277/583
(58) Field of Search ................................ 277/408, 413, 277/422, 388, 583

(56) References Cited

U.S. PATENT DOCUMENTS

| | | | | |
|---|---|---|---|---|
| 2,614,870 A | * | 10/1952 | Ray | 277/413 |
| 3,594,010 A | * | 7/1971 | Warth | 277/413 |
| 4,436,311 A | * | 3/1984 | Brandon | 277/413 |
| 4,795,307 A | | 1/1989 | Liebl | |
| 5,054,996 A | | 10/1991 | Carreno | |
| 5,595,472 A | | 1/1997 | Quattrociocchi | |
| 5,603,510 A | * | 2/1997 | Sanders | 277/413 |
| 5,971,400 A | * | 10/1999 | Turnquist et al. | 277/416 |
| 6,142,477 A | | 11/2000 | Meinzer | |
| 6,193,240 B1 | | 2/2001 | Johnson et al. | |
| 6,220,814 B1 | | 4/2001 | Brushwood et al. | |
| 6,250,641 B1 | * | 6/2001 | Dinc et al. | 277/355 |
| 6,302,399 B1 | * | 10/2001 | Prinzing | 277/300 |
| 6,486,487 B2 | | 11/2002 | Johnson et al. | |
| 6,505,834 B1 | | 1/2003 | Dinc et al. | |
| 6,572,115 B1 | * | 6/2003 | Sarshar et al. | 277/412 |
| 6,655,696 B1 | * | 12/2003 | Fang et al. | 277/409 |
| 2001/0007384 A1 | | 7/2001 | Skinner et al. | |
| 2002/0109303 A1 | | 8/2002 | Fried | |
| 2002/0117806 A1 | | 8/2002 | Grondahl | |

* cited by examiner

Primary Examiner—Alison K. Pickard

(57) ABSTRACT

A seal assembly and a rotary machine in combination with the seal assembly are provided. The seal assembly includes a seal and a biasing device configured to produce a force for mechanically biasing the seal toward a first position relative to the rotatable portion. The seal is further responsive to pressurized fluid for creating a force opposed to the biasing force to cause movement of the seal toward a second position closer to the rotatable portion than the first position, thereby reducing flow leakage between the stationary portion and the rotatable portion. The pressurized fluid may be the working fluid produced by or used within the rotary machine.

12 Claims, 2 Drawing Sheets

SEAL ASSEMBLY FOR A ROTARY MACHINE

FIELD OF THE INVENTION

The present invention relates in general to seals for multistage rotary machines and, more particularly, to an assembly for protecting the seals normally provided between stages of the machine and for establishing improved interstage leakage control.

BACKGROUND OF THE INVENTION

In various multistage rotary machines used for energy conversion, such as turbines, a fluid is used to produce rotational motion. In a gas turbine, for example, a gas is compressed in a compressor and mixed with a fuel source in a combustor. The combination of gas and fuel is then ignited for generating combustion gases that are directed to turbine stage(s) to produce the rotational motion. Both turbine stage(s) and compressor have stationary or non-rotary components, e.g., vanes, that cooperate with rotatable components, e.g., rotor blades, for compressing and expanding the operational gases.

Any fluid leakage between stages reduces turbine performance and efficiency and therefore, interstage seals in seal housings are provided to reduce such leakage. In general, fluid leakage is reduced when the gap between the seal and a rotor assembly is minimized. It is known that during turbine transients, the rotor assembly expands radially and may actually contact the seal, causing undesirable deformation and wear thereof. In order to prevent this undesirable contact from occurring, the seal housing may be positioned at a sufficient distance from the rotor assembly so as to allow for this initial expansion of the rotor assembly. However, during steady state operation, due to the initial positioning of the seal housing, the distance between the seal and rotor assembly may not be optimal for avoiding or reducing leakage of fluid, thus reducing turbine performance.

In view of the foregoing considerations it is desirable to provide a reliable and low-cost arrangement whereby the seals may be positioned closer to the rotor assembly during steady state operation to reduce fluid bypass and to thereby increase the overall efficiency of the rotary machinery. It is further desirable for the seal arrangement to sufficiently and consistently open up during transient periods such as during start up of the turbine or upon turbine shut down in order to prevent undesirable rubbing between the seal and any moving component.

SUMMARY OF THE INVENTION

Generally, the present invention fulfills the foregoing needs by providing in one aspect thereof, a seal assembly for a rotary machine having a stationary portion, and a rotatable portion. The seal assembly is made up of a seal, and a biasing device configured to produce a force for mechanically biasing the seal toward a first position relative to the rotatable portion. The seal is further responsive to pressurized fluid for creating a force opposed to the biasing force to cause movement of the seal towards a second position closer to the rotatable portion than the first position, thereby reducing flow leakage between the stationary portion and the rotatable portion.

In another aspect thereof, the present invention further fulfills the foregoing needs by providing a rotary machine made up of a stationary portion, a rotatable portion, and a seal assembly configured to variably seal the stationary portion relative to the rotatable portion. A seal assembly is configured to variably seal the stationary portion relative to the rotatable portion. The seal assembly comprises a seal. The seal assembly may further comprise a biasing device configured to produce a force for mechanically biasing the seal toward a first position relative to the rotatable portion, and a chamber for receiving pressurized fluid and creating a force opposite to the biasing force to cause movement of the seal towards a second position closer to the rotatable portion than the first position.

BRIEF DESCRIPTION OF THE DRAWINGS

The features and advantages of the present invention will become apparent from the following detailed description of the invention when read with the accompanying drawings in which:

FIG. 1 illustrates a condition wherein the seal assembly provides a maximum seal clearance.

DETAILED DESCRIPTION OF THE INVENTION

Figure 1:
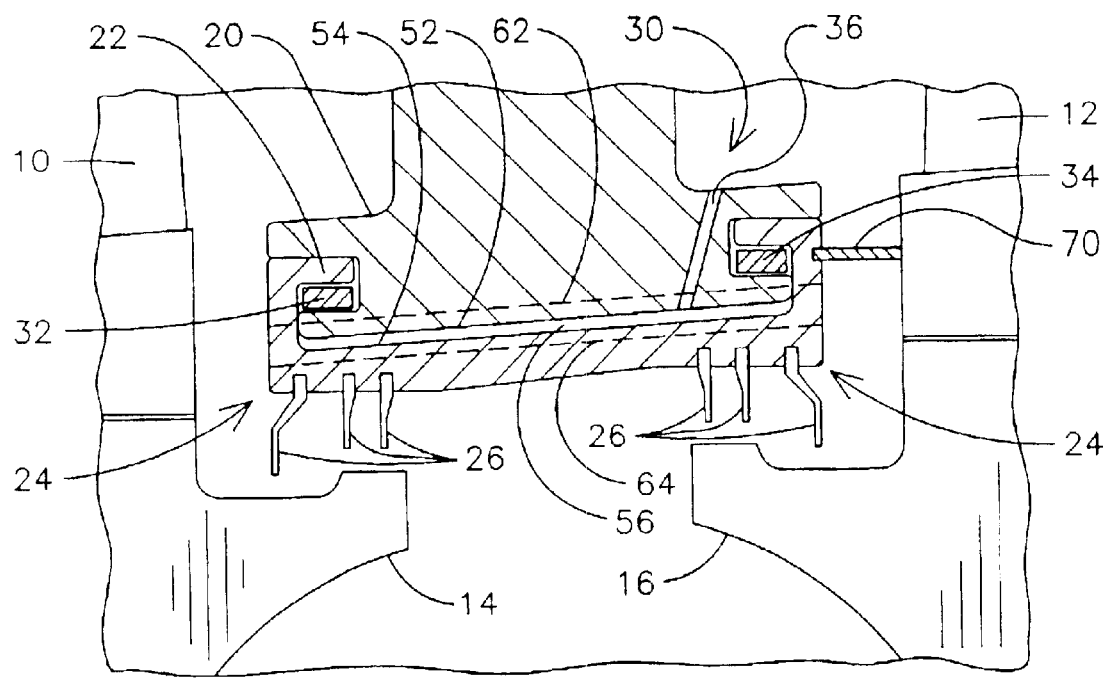
FIG. 1 is a cross-sectional view of a seal assembly that provides a variable seal clearance to match the operational requirements of the machine. More particularly.
Figure 2:
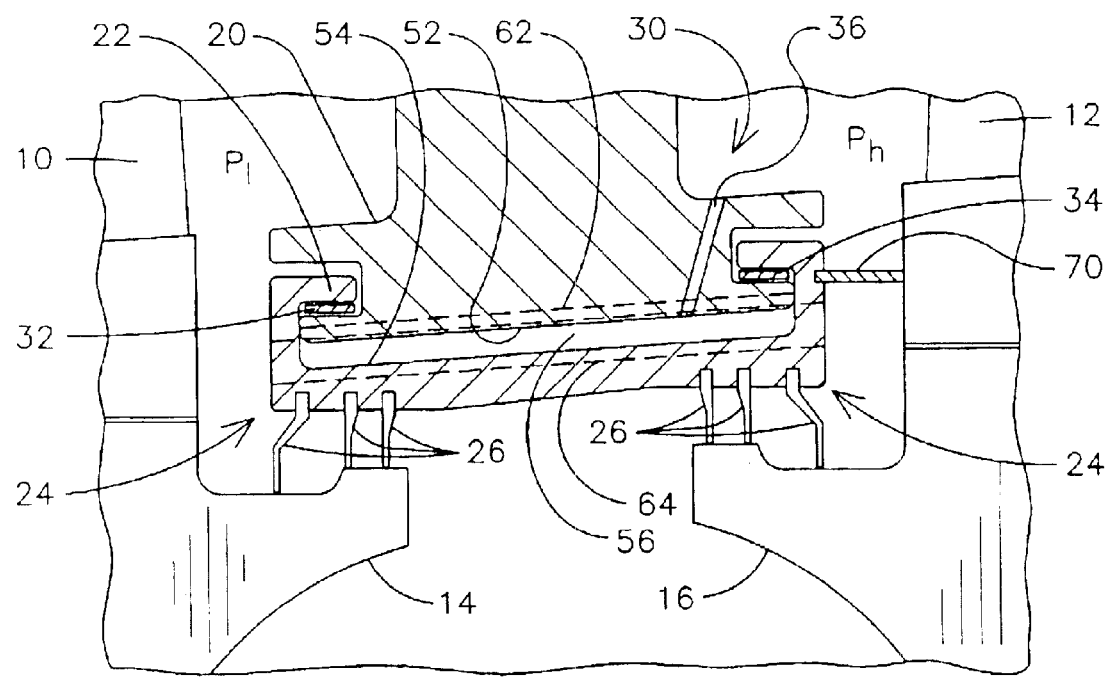
FIG. 2 illustrates the seal assembly of FIG. 1 during a condition that results in a minimum seal clearance during steady state operation of the machine.

Although the present invention may be applicable to a variety of rotary machinery, such as gas or steam turbines, compressors, etc., it will be described with respect to a gas turbine, a portion of which is illustrated in FIGS. 1 and 2.

FIGS. 1 and 2 illustrate two turbine blades 10 and 12 connected to respective rotor arms 14 and 16 of a rotor assembly. A stationary portion 20 (e.g., a vane) of the turbine provides support to a seal housing 22 that includes one or more seals 24, such as a labyrinth seal, having a plurality of fingers, e.g., fingers 26, or a compliant seal (e.g. brush seal) or an abraidable seal (e.g. honeycomb or feltmetal seal) or any combination thereof extending toward the rotor arms.

The inventor of the present invention has innovatively recognized a seal assembly that provides a variable seal clearance to match the operational requirements of the machine, such as a maximum seal clearance during start-up of the machine and a minimum clearance during steady state operation of the machine.

A biasing device, such as may be exemplarily made up of a pair of leaf springs 32 and 34, is provided for mechanically biasing the seal housing. As will be appreciated by those skilled in the art, the biasing device may be implemented in a variety of ways, such as coil springs, elastomeric construction, hydraulic or pneumatic device. The biasing device is configured so that in a decompressed state the seal housing along with the seal is radially positioned so that the seal is sufficiently apart relative to the rotatable portion (e.g., rotor arms 14 and 16) during transient conditions (e.g., startup of the machine) to avoid contact between the rotatable portion and the seal. Thus, the biasing device causes the seal to be in a normally open condition relative to the rotatable portion. This operational condition is illustrated in FIG. 1. This is an innovative use of a biasing device for interstage sealing since traditionally springs were merely used to provide a somewhat cushioned engagement (e.g., softer ride) between the seal and the rotatable portion of the machine.

In one exemplary embodiment, stationary portion 20 includes a passageway 36 fluidly coupled to a chamber 50 (FIG. 3) for receiving pressurized fluid that causes movement of the seal housing along with the seal so that the seal becomes sufficiently close relative to the rotatable portion during steady state operation of the machine to reduce leakage between the rotatable portion and the seal. This operational condition is illustrated in FIG. 2.

As will be now appreciated by those skilled in the art, the biasing device is configured to produce a force for mechanically biasing the seal toward a first position (e.g., retracted) relative to the rotatable portion. Chamber 50 through passageway 36 allows receiving pressurized fluid and creating a force opposite to the biasing force to cause movement of the seal towards a second position closer to the rotatable portion than the first position.

During steady state operation of the machine, a higher pressure region $P_h$ and a lower pressure region Pl are normally developed as pressurized fluid flows from stage to stage of the machine to impart rotational motion to the rotor blades therein. In one exemplary embodiment, illustrated in FIG. 2, pressure developed at higher pressure, region $P_h$ passes through passageway 36 to cause the movement of the seal housing along with the seal that results in the relatively closer gap or clearance between the rotatable portion and the seal. The foregoing embodiment comprises one economical and straightforward way for obtaining the pressurized fluid since it utilizes pressurized fluid that is inherently available within the machine. It will be appreciated, however, that the source of pressurized fluid may be any pressure source (external or internal relative to the machine) configured to provide sufficient force to overcome the biasing force provided by the biasing device.

Figure 3:
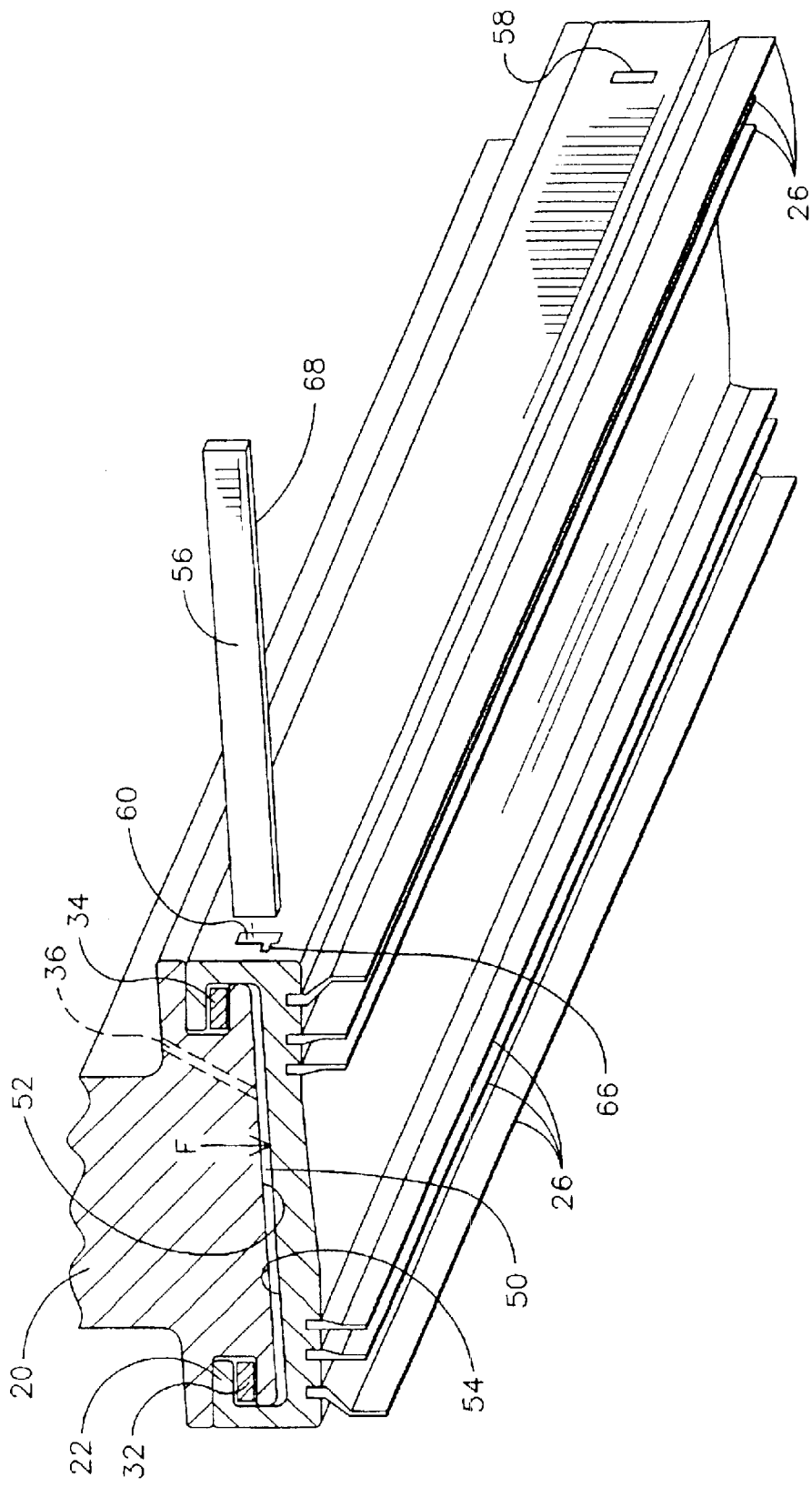
FIG. 3 illustrates an isometric view of an exemplary seam assembly embodying aspects of the present invention.

FIG. 3 is an isometric view that illustrates chamber 50 that in one exemplary embodiment is defined in part by mutually opposite surfaces of the seal housing and the stationary portion, such as bottom surface 52 of stationary portion 20 and top surface 54 of seal housing 22. The chamber is further defined by mutually opposite shims 56 and 58, such as may be slidably mounted through a respective slot in a lateral wall of the seal housing. In FIG. 3, for example, shim 56 is shown prior to being mounted through a slot 60, whereas shim 58 is shown as already mounted through its corresponding slot. Shim 56 is shown in FIGS. 1 and 2 in a mounted condition. Each shim may be mounted between a groove 62 (FIG. 2) configured in surface 52 of the stationary portion and a groove 64 (FIG. 2) configured in surface 54 of the seal housing. It will be appreciated that the depth of groove 62 may be slightly larger relative to the height of the shim therein so as to accommodate movement of the shim as the volume of chamber 50 expands or contracts. Passageway 36 is interposed between shims 56 and 58. Thus, chamber 50 is fluidly coupled to passageway 36 for receiving the pressurized fluid.

In operation, as pressure builds in the chamber, a pressure-induced force represented by arrow F in FIG. 3 will be exerted against surface 54 causing seal housing 22 to move downwardly until the biasing device is compressed and the sealing gap has been reduced. Once the turbine is shut off, pressure will be released from the chamber and the biasing force provided by the biasing device will cause the seal housing along with the seal to return to an open gap condition and this will avoid the possibility of rubbing between the seal and the rotor arms once the turbine is turned on for a new cycle of operation. A respective sealing joint, such as C-type joint 66, may be provided for providing an even tighter seal between a respective edge of one of the shims (e.g., shim edge 68) and a corresponding groove (e.g., groove 64). Depending on the requirements of any given application, an additional seal 70 (FIGS. 1 and 2), such as a compliant seal (e.g. brush seal), labyrinth seal, abraidable seal (honeycomb or feltmetal), or any combination thereof, may be provided to further reduce interstage fluid bypass.

As will be appreciated by those skilled in the art, the seal assembly shown in, FIG. 3 represents one segment of multiple segments (e.g., six segments) that are serially connected to one another to provide the required sealing function across the full circumference of each respective stage of the multistage rotary machine. Each of the mutually engaging ends of each segment may be configured to provide a pluggable type of engagement. For example, one of the mutually engaging ends may provide a male-plugging structure while the other end may provide a female-receptacle structure.

Thus, with the present invention, during start up of the engine and in the absence of any pressure, the seal will be initially positioned due to the biasing force provided by the biasing device to avoid undesirable rubbing between the seal and the rotating components. During steady state, the seal will be positioned to avoid or reduce fluid bypass in response to pressure that may be internally or externally derived. Upon shut down of the turbine, the biasing force provided by the biasing device will restore the seal to a position the will ensure the no rubbing occurs once the turbine is restarted.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A seal assembly for a rotary machine having a stationary portion and a rotatable portion, the seal assembly comprising:

a seal:

biasing device configured to produce a force for mechanically biasing the seal toward a first position relative to the rotatable portion, the seal being further responsive to a pressurized fluid for creating a force opposed to the biasing force to cause movement of the seal toward a second position closer to the rotatable portion than the first position; and a chamber for receiving the pressurized fluid, and in direct communication with said pressurized fluid wherein the chamber is defined in part by opposed surfaces of a seal housing and the stationary portion, wherein the chamber is further defined by a shim disposed in a slot in a lateral wall of the seal housing.

2. A seal assembly for a rotary machine having a stationary portion and a rotatable portion, the seal assembly comprising:

a seal:

a biasing device configured to produce a force for mechanically biasing the seal toward a first position relative to the rotatable portion, the seal being further responsive to a pressurized fluid for creating a force opposed to the biasing force to cause movement of the seal toward a second position closer to the rotatable portion than the first position; and a chamber for receiving the pressurized fluid, wherein the chamber is defined in part by opposed surfaces of a seal housing and the stationary portion, and wherein the chamber is further defined by a shim disposed in a slot in a lateral wall of the seal housing, the shim positioned to extend into respective opposed grooves in opposed surfaces of the stationary portion and th seal housing.

3. The seal assembly of claim 2 wherein the pressurized fluid is internally derived relative to the machine.

4. The seal assembly of claim 2 wherein the pressurized fluid is externally derived relative to the machine.

5. The seal assembly of claim 2 wherein the biasing device comprises a leaf spring.

6. A seal assembly for a rotary machine having a stationary portion and a rotatable portion, the seal assembly comprising:

a seal;

a biasing device configured to produce a force for mechanically biasing the seal toward a first position relative to the rotatable portion, the seal being further responsive to a pressurized fluid for creating a force opposed to the biasing force to cause movement of the seal toward a second position closer to the rotatable portion than the first position;

a chamber for receiving the pressurized fluid, wherein the chamber is defined in part by opposed surfaces of a seal housing and the stationary portion, wherein the chamber is further defined by a shim disposed in a slot in a lateral wall of the seal housing; and a sealing joint between the shim and the slot.

7. A rotary machine comprising:

a stationary portion;

a rotatable portion; and a seal assembly configured to variably seal the stationary portion relative to the rotatable portion, the seal assembly comprising:

a seal;

a biasing device configured to produce a force for mechanically biasing the seal toward a first position relative to the rotatable portion; and a chamber for receiving pressurized fluid and creating a force opposed to the biasing force to cause movement of the seal toward a second position closer to the rotatable portion than the first position, wherein the defined in part by opposed surfaces of a seal housing and the stationary portion, wherein the chamber is further defined by mutually opposite shims mountable through respective slots in a lateral wall of the seal housing.

8. A rotary machine comprising:

a stationary portion;

a rotatable portion; and a seal assembly configured to variably seal the stationary portion relative to the rotatable portion, the seal assembly comprising:

a seal;

a biasing device configured to produce a force for mechanically biasing the seal toward a first position relative to the rotatable portion; and a chamber for receiving pressurized fluid and creating a force opposed to the biasing force to cause movement of the seal toward a second position closer to the rotatable portion than the first position, wherein the chamber is defined in part by opposed surfaces of a seal housing and the stationary portion, wherein the chamber is further defined by mutually opposite shims mountable through respective slots in a lateral wall of the seal housing, wherein each shim is positioned between a respective groove in each of the mutually opposite surfaces of the stationary portion and the seal housing.

9. The rotary machine of claim 8 further comprising a respective sealing joint between a respective edge of the shims and a corresponding groove.

10. The rotary machine of claim 8 wherein the pressurized fluid is internally derived relative to the machine.

11. The rotary machine of claim 8 wherein the pressurized fluid is externally derived relative to the machine.

12. A rotary machine comprising:

a stationary portion;

a rotatable portion;

a seal connected to the stationary portion for restricting a flow of fluid between the stationary portion and the rotatable portion;

a means for biasing the seal to a position retracted from the rotatable portion; and a means for using a pressurized fluid to oppose the means for biasing in order to move the seal to a position extended toward the rotatable portion, thereby reducing fluid leakage between the stationary portion and the rotatable portion, said means for using a pressurized fluid comprising mutually opposite shims mountable through respective slots in a lateral wall of the seal, and wherein each shim is positioned between a respective groove in each of mutually opposite surfaces of the stationary portion and the seal.

* * * * *